J. SATTISON.
Butter-Worker.
No. 223,654. Patented Jan. 20, 1880.
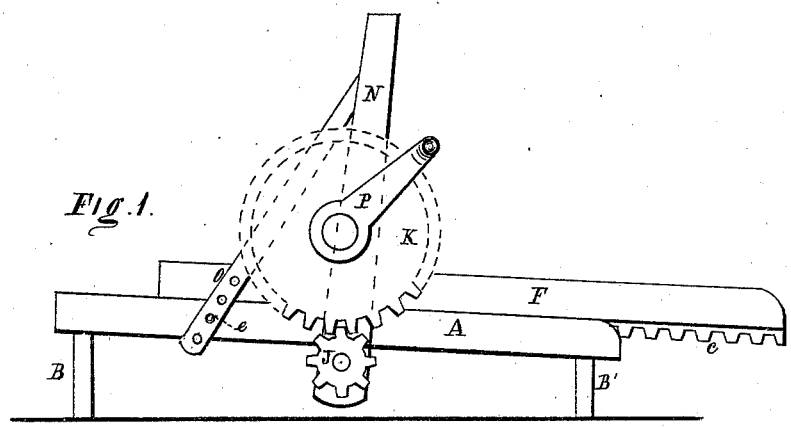
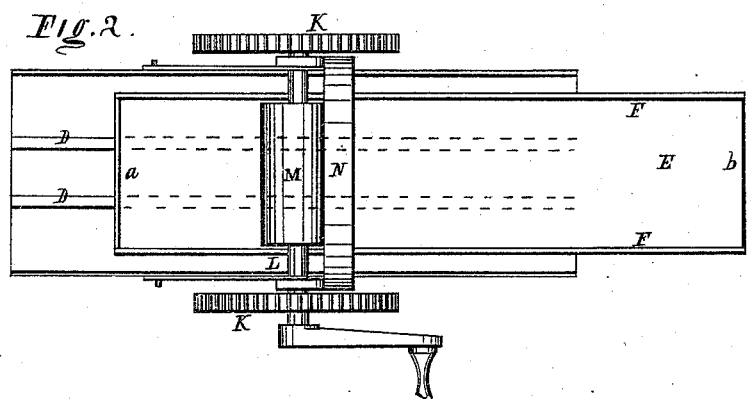
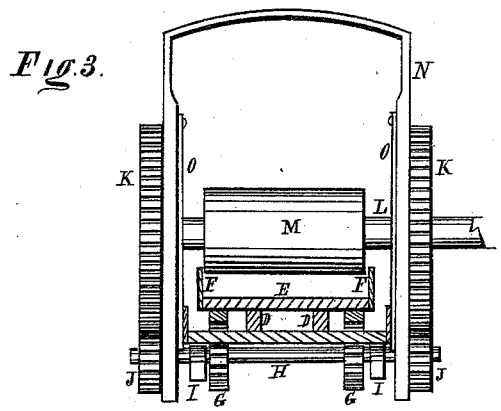

UNITED STATES PATENT OFFICE.

JACOB SATTISON, OF RIPLY TOWNSHIP, HURON COUNTY, OHIO, ASSIGNOR OF ONE-HALF OF HIS RIGHT TO JACOB TRUXEL, OF SAME PLACE.

BUTTER-WORKER.

SPECIFICATION forming part of Letters Patent No. 223,654, dated January 20, 1880.

Application filed August 15, 1879.

*To all whom it may concern:*

Be it known that I, JACOB SATTISON, of Riply township, in the county of Huron and State of Ohio, have invented new and useful Improvements in Machines for Working Butter, &c., of which the following is a description.

The purpose of this invention, as above said, is for working the milk from new-made butter, and for reworking the same on becoming old; also, the machine may be used for rolling dough into pie-crust, cakes, &c., and for expressing the juice from small fruits, and for other similar purposes.

Said machine consists of an oblong square table slightly elevated at one end above the other. Lengthwise through the middle of the table are a pair of ways, on which slides reciprocally, by means of a rack and pinion, an oblong square trough having a flat plain bottom. Transversely across the trough, and within the sides of the same, is arranged a roller operated by a crank, all of which is more fully described in the following specification and annexed drawings, making a part of the same, in which—

Figure 1 represents a side elevation of the machine. Fig. 2 is a plan view. Fig. 3 is an end view, partially in section.

Like letters of reference refer to like parts in the several views.

In the drawings, A represents the table above alluded to, supported upon the legs B B'. The legs B are somewhat longer than the legs B', to give an inclined position to the table, for a purpose presently shown. D represents the ways above referred to. On said ways rests and slides the trough E, Fig. 2. Said trough consists of a plain flat bottom and low sides F. The end *a* of the trough is closed, whereas the opposite end *b* is open.

Along each edge of the under side of the bottom of the trough are secured, respectively, racks *c*, Fig. 1, made to engage the pinions G, Fig. 3, on a shaft, H, secured to the under side of the table by hangers I. Said pinions project through the bottom of the table in order to engage the racks, as shown in Fig. 3.

On each end of the shaft H is a pinion, J, arranged to engage the cog-wheels K on the shaft L of the roller M. Said shaft L has its bearings in a yoke or frame, N, supported in place by the shaft H, through the ends of which frame the shaft H passes, as seen in the drawings. The frame or yoke N is held in position by braces O, which are adjustable, for a purpose hereinafter shown.

This machine, as before said, is for expressing milk from fresh-churned butter. To this end the unworked butter is placed in the trough E in front of the roller. The roller is then revolved by the crank P, thereby pressing the mass of butter down upon the bottom of the trough. The trough at the same time is carried under the revolving roller by the racks and pinions, which brings the entire mass of butter to the action of the roller. The milk expressed from the butter flows down the inclined trough to the end and falls therefrom into a pail or other vessel. The butter having passed once under the roller is then heaped up and again passed under it by moving the trough in the opposite direction, which being done, the butter is again bunched up and submitted to the action of the roller. This operation is repeated until all the milk is worked out.

In the event that more or less pressure is required to be exerted by the roller it is obtained by raising or lowering it. This is done by lengthening or shortening the braces O by shifting the pin *e* in the several holes in the braces, as the case may be.

Although this machine is intended for working butter, it can be used for rolling dough for pies, &c., and for expressing the juice from small fruits, and for other similar domestic purposes.

I do not claim, broadly, a butter-working machine having an inclined reciprocating trough operated by an arrangement of pinions and pinion-racks, as the same has been made public; but what distinguishes my improvement is the combination and arrangement of the several parts herein claimed.

What I claim as my improvement, and desire to secure by Letters Patent, is—

In combination with an inclined reciprocating trough and suitable mechanism for operating the same, the yoke or frame N, having journaled in the ends thereof a roller, supported in position by adjusting braces adapted to regulate the pressure of said roller, and operating conjointly with the aforesaid trough by means of a pinion, J, and cog-wheel, substantially as described, for the purpose set forth.

JACOB SATTISON.

Witnesses:
J. H. BURRIDGE,
S. MANNING.